United States Patent [19]

Louis

[11] Patent Number: 4,604,331

[45] Date of Patent: * Aug. 5, 1986

[54] FUEL CELL SEPARATOR PLATE WITH BELLOWS-TYPE SEALING FLANGES

[75] Inventor: George A. Louis, West Hartford, Conn.

[73] Assignee: The United States of America as represented by the United States Department of Energy, Washington, D.C.

[*] Notice: The portion of the term of this patent subsequent to Apr. 30, 2002 has been disclaimed.

[21] Appl. No.: 614,505

[22] Filed: May 29, 1984

[51] Int. Cl.⁴ .............................................. H01M 2/18
[52] U.S. Cl. ........................................ 429/35; 429/37
[58] Field of Search .................... 429/34, 35, 36, 37, 429/247, 129

[56] References Cited

U.S. PATENT DOCUMENTS

| | | | |
|---|---|---|---|
| 3,282,734 | 11/1966 | Rzewinski | 429/35 |
| 3,607,418 | 9/1971 | Ortlieb et al. | 429/35 |
| 4,345,009 | 8/1982 | Fahle et al. | 429/37 |
| 4,450,212 | 5/1984 | Feigenbaum et al. | 429/35 |
| 4,514,475 | 4/1985 | Mientek | 429/35 |

Primary Examiner—Anthony Skapars
Attorney, Agent, or Firm—Hugh W. Glenn; Robert J. Fisher; Judson R. Hightower

[57] ABSTRACT

A fuel cell separator includes a rectangular flat plate having two unitary upper sealing flanges respectively comprising opposite marginal edges of the plate folded upwardly and back on themselves and two lower sealing flanges respectively comprising the other two marginal edges of the plate folded downwardly and back on themselves. Each of the sealing flanges includes a flat wall spaced from the plate and substantially parallel thereto and two accordion-pleated side walls, one of which interconnects the flat wall with the plate and the other of which stops just short of the plate, these side walls affording resilient compressibility to the sealing flange in a direction generally normal to the plane of the plate. Four corner members close the ends of the sealing flanges. An additional resiliently compressible reinforcing member may be inserted in the passages formed by each of the sealing flanges with the plate.

19 Claims, 6 Drawing Figures

FUEL CELL SEPARATOR PLATE WITH BELLOWS-TYPE SEALING FLANGES

CONTRACTUAL ORIGIN OF THE INVENTION

The United States Government has rights in this invention pursuant to Contract No. DE-AC01-79ET15440 between the U.S. Department of Energy and United Technologies Power Systems.

REFERENCE TO RELATED APPLICATION

The present invention is an improvement of the invention disclosed in U.S. Pat. No. 4,514,475, issued Apr. 30, 1985, Ser. No. 595,012, filed Mar. 30, 1984, entitled "Fuel Cell Separator with Compressive Sealing Flanges", by Anthony P. Mientek, assigned to the assignee of the present invention, and the disclosure of which is incorporated herein by reference.

BACKGROUND OF THE INVENTION

The present invention relates to separator plates for separating adjacent fuel cells in a stack of such cells. In particular, the invention relates to improved sealing rails for such separator plates.

The aforementioned application discloses a fuel cell separator plate with compressible sealing rails. More specifically, each of the sealing rails comprises a marginal flange of the separator plate folded back on itself and cooperating with the plate to form a channel in which is inserted a stack of thin metal sheets. The thin metal sheets are bonded to one another, the sealing flange and the plate in a laminated structure having the desired thickness. Each of the thin metal sheets, in its as-fabricated condition, has a slight deviation from true flatness so as to afford a degree of compressibility to the stack. This compressibility can be increased by mechanical working of the thin metal sheets. While this arrangement is advantageous in permitting variation of the thickness of the sealing rails to accommodate variations in the thickness of the associated fuel cell components as a result of creep, thermal expansion and the like, it comprises a relatively large number of parts which must be assembled together.

SUMMARY OF THE INVENTION

It is a general object of the present invention to provide an improved fuel cell separator plate which avoids the disadvantages of prior separators while affording additional structural and operating advantages.

An important object of this invention is the provision of a fuel cell separator which accommodates changes in the thickness of the associated fuel cell components without loss of sealing integrity and good thermal and electrical contact, but which is of simpler and more economical construction than prior separators.

These and other objects of the invention are attained by providing a fuel cell separator consisting of a substantially flat, planar, gas-impermeable plate, and a sealing flange unitary with the plate and comprising a peripheral margin of the plate folded back upon itself, the sealing flange including a first portion spaced from the plate and a second portion resiliently compressible in a direction generally normal to the plane of the plate for accommodating variation in the spacing between the first portion and the plate.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DESCRIPTION OF THE FIGURES

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
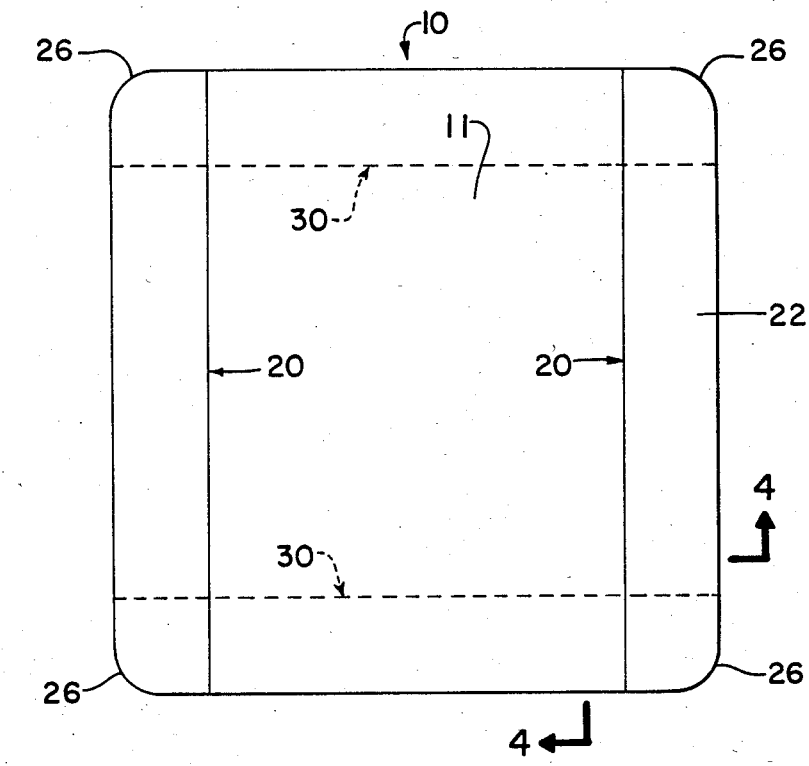
FIG. 1 is a top plan view of a fuel cell separator constructed in accordance with and embodying the features of a first embodiment of the present invention.
Figure 2:
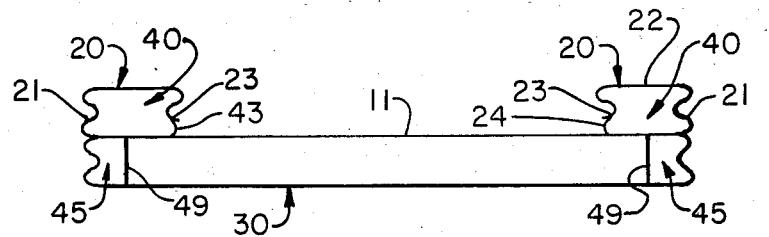
FIG. 2 is a front elevational view of the separator of FIG. 1.
Figure 3:
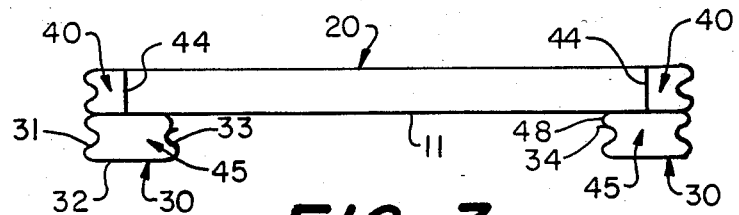
FIG. 3 is a side elevational view of the separator of FIG. 1, as viewed from the right-hand side thereof, rotated 90° clockwise.
Figure 4:
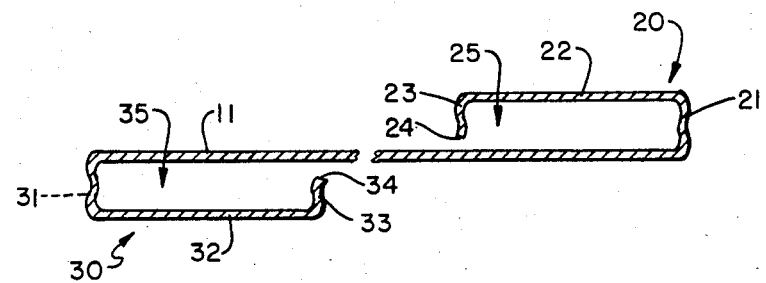
FIG. 4 is an enlarged view in vertical section taken along the line 4—4 in FIG. 1.
Figure 5:
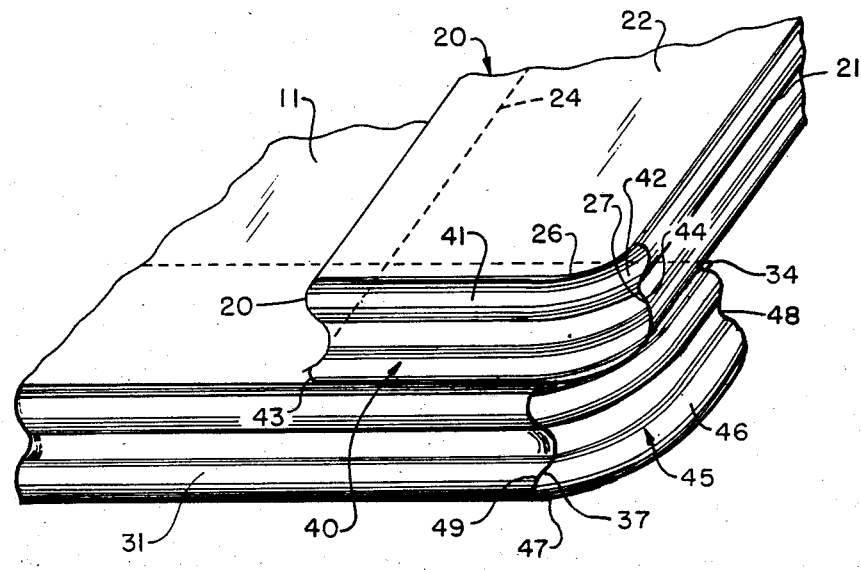
FIG. 5 is an enlarged, fragmentary, perspective view of one corner of the separator of FIG. 1 showing the corner inserts.

Referring to FIGS. 1 through 5 of the drawings, there is illustrated a fuel cell separator, generally designated by the numeral 10, constructed in accordance with and embodying the features of the present invention. The separator 10 is of the type which is used for separating the adjacent fuel cells of a stack of fuel cells, as disclosed in the aforementioned copending application Ser. No. 595,012. Preferably, the separator 10 is designed for use in molten carbonate fuel cells, but it will be appreciated that the principles of the present invention could be utilized with other types of fuel cells.

The separator 10 includes a flat, rectangular metal plate 11 provided respectively along opposite side edges thereof with a pair of upper sealing flanges 20, each of which comprises a unitary margin of the plate 11 folded back upon itself. Each of the sealing flanges 20 has an accordion-pleated outer side portion 21 which extends upwardly from the plate 11 and is integral at the upper end thereof with a laterally inwardly extending, flat, rectangular portion 22 which overlaps the plate 11 and is spaced a predetermined distance thereabove. The flat portion 22 is provided at the distal end thereof with an integral, depending, accordion-pleated inner side portion 23 which terminates at a distal end edge 24 spaced a predetermined slight distance from the upper surface of the plate 11. The flat portion 22 and the side portions 21 and 23 of the sealing flange 20 cooperate with the overlapped portion of the plate 11 to form an elongated channel or passage 25 (FIG. 4) which extends the length of the upper sealing flange 20 and is generally rectangular in transverse cross section.

In like manner, the other side edges of the plate 11 are respectively provided with a pair of lower sealing flanges 30, each of which comprises a unitary margin of the plate 11 folded downwardly and back upon itself beneath the plate 11. Each of the lower sealing flanges 30 has an accordion-pleated outer side portion 31 which projects downwardly from the plate 11 and is integral at the lower end thereof with a laterally inwardly extending, flat, rectangular portion 32 which overlaps the plate 11 and is spaced a predetermined distance therebelow. The flat portion 32 is integral at its inner end with an upstanding accordion-pleated inner side portion 33 which terminates at a distal end edge 34 spaced a predetermined slight distance from the lower surface of the plate 11. The outer side portion 31, the flat portion 32 and the inner side portion 33 of the the lower sealing flange 30 cooperate with the overlapped portion of the plate 11 for defining an elongated channel or passage 35 (FIG. 4) which extends the length of the lower sealing flange 30 and is generally rectangular in transverse cross section.

The folds in the sealing flanges 20 and 30 are such that each flange has a length substantially equal to that of the overlapped portion of the plate 11. Furthermore, each of the flanges 20 and 30 is cut so that the flat portions 22 and 32 thereof are respectively formed with rounded corners 26 at the ends thereof. This results in the pleated outer side portions 21 and 31 being respectively provided with end edges 27 and 37 (see FIG. 5) which are respectively spaced from the adjacent end edges of the flat portions 22 and 32. The folding back of the sealing flanges 20 and 30 results in the channels or passages 25 and 35 thereof being open at their opposite ends.

In order to close these open ends, the separator 10 is provided with corner inserts 40 at the opposite ends of each of the sealing flanges 20 and corner inserts 45 at the opposite ends of each of the sealing flanges 30. Each of the corner inserts 40 and 45 is a generally L-shaped member of unitary one-piece construction. The corner insert 40 includes a long wall 41 joined at one end thereof by a rounded corner portion to a short wall 42 which extends substantially perpendicular to the long wall 41. The walls 41 and 42 respectively terminate in distal end edges 43 and 44. Each of the walls 41 and 42 is accordion-pleated to mate with the pleating of the outer side portion 21 and the inner side portion 23 of the associated sealing flange 20, the end edges 43 and 44 being respectively shaped to mate with the adjacent end edge of the inner side portion 23 and the end edge 27 of the outer side portion 21.

Similarly, the corner insert 45 has a long wall 46 joined at one end thereof by a rounded corner portion to a short wall 47 which extends substantially perpendicular to the long wall 46. The walls 46 and 47 respectively terminate in distal end edges 48 and 49. Each of the walls 46 and 47 is accordion-pleated to mate with the pleating of the outer side portion 31 and the inner side portion 33 of the associated sealing flange 30, the end edges 48 and 49 being respectively shaped to mate with the adjacent end edge of the inner side portion 33 and the end edge 37 of the outer side portion 31.

In use, a corner insert 40 is fitted in each end of each of the sealing flanges 20, and a corner insert 45 is fitted in each end of each of the sealing flanges 30. Each of the corner inserts 40 and 45 is secured in place as by welding, for example, by laser welding, around the perimeter of the corner inserts 40 and 45. When thus welded in place, the short walls 42 and 47 are respectively continuous with the outer side portions 21 and 31 of the sealing flanges 20 and 30. Furthermore, it will be appreciated that the corner inserts 40 and 45, in addition to closing the ends of the channels 25 and 35, provide sealing closures between adjacent cells of the stack, and also provide suitable surfaces for sealing the manifolds, as can be more clearly understood from the disclosure of the aforementioned copending application Ser. No. 595,012.

In operation, the upper and lower sealing flanges 20 and 30 operate in substantially the same way as the sealing rails of the separator disclosed in the aforementioned copending application Ser. No. 595,012. More specifically, when the associated fuel cells are placed in vertical compression, the accordion-pleated or bellows-like construction of the side portions 21 and 23 of the upper sealing flanges 20 and the side portions 31 and 33 of the lower sealing flanges 30 permit a resilient compression of the sealing flanges 20 and 30. This compression is facilitated by the accordion-pleated construction of the walls 41 and 42 of the corner inserts 40 and the walls 47 and 48 of the corner inserts 45. During such compression, the distal end edges 24 and 34 of the inner side portions 23 and 33 may be brought into engagement with the plate 11. When the compressive forces are released, or when the fuel cell stack undergoes thermal expansion or the like, the resilience of the sealing flanges 20 and 30 permits them to return toward their normal configuration for maintaining the integrity of the seals around the associated fuel cells.

Figure 6:
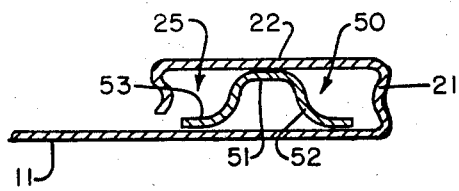
FIG. 6 is an enlarged fragmentary view in vertical section, similar to the right-hand portion of FIG. 4, illustrating an alternative embodiment of the present invention.

Referring to FIG. 6 of the drawings, there is illustrated an alternative form of the separator 10 of the present invention. This form is substantially identical to that disclosed in FIGS. 1-5, with the exception that there is added to each of the sealing flanges 20 and 30 a reinforcing member 50 which is disposed in the associated passage 25 or 35 defined by the sealing flange 20 or 30. While FIG. 6 illustrates a reinforcing member 50 only in the passage 25 of an upper sealing flange 20, it will be appreciated that the same arrangement would be used in the lower sealing flanges 30, except that the reinforcing member 50 would be inverted.

The reinforcing member 50 is an elongated channel-shaped member which is generally hat-shaped in transverse cross section. More specifically, the reinforcing member 50 has a flat rectangular top 51 integral along the opposite side edges thereof with depending sloping sides 52, each of which is provided at its lower end with a laterally outwardly extending foot 53. The reinforcing member 50 is dimensioned to fit freely within the passage 25 or 35, with the feet 53 disposed for engagement with the plate 11 and with the top 51 disposed for engagement with the flat portion 22 or 32 of the associated sealing flange 20 or 30. It will be appreciated that the reinforcing member 50 is, itself, resiliently compressible in a direction normal to the plane of the plate 11, but will serve to add stiffness to the associated sealing flange 20 or 30 so as to increase the compressive forces which can be tolerated by the separator 10.

In a constructional model of the separator 10, the plate 11, the corner inserts 40 and 45 and the reinforcing member 50 may all be formed of the same material as the separator disclosed in the aforementioned copending application Ser. No. 595,012.

From the foregoing, it can be seen that there has been provided an improved fuel cell separator which is of simplified and economical construction, while affording adjustability in the thickness of the sealing flanges so as to be able to accommodate compressive and expansive forces in the associated fuel cells.

The embodiments of the invention in which an exclusive property or privilege is claimed are defined as follows:

1. A fuel cell separator comprising a substantially flat, planar, gas-impermeable plate, and a sealing flange unitary with said plate and consisting of a peripheral margin of said plate folded back upon itself, said sealing flange including a first portion spaced from said plate and a second portion resiliently compressible in a direction generally normal to the plane of said plate for accommodating variation in the spacing between said first portion and said plate, said second portion of said sealing flange comprises an accordion pleated portion interconnecting said first portion and said plate.

2. The separator of claim 1, wherein said first portion of said sealing flange is a substantially flat portion disposed substantially parallel to the plane of said plate.

3. The separator of claim 1, wherein said sealing flange further includes a third portion extending from said first portion toward said plate and cooperating with said first and second portions and said plate to define a substantially closed passage.

4. The separator of claim 3, wherein said third portion is resiliently compressible and is normally spaced a slight distance from said plate, said third portion being resiliently engageable with said plate upon compression of said second portion.

5. The separator of claim 1, wherein said sealing flange is a first sealing flange projecting in a first direction from the plane of said plate, and further including a second sealing flange projecting from the plane of said plate in the opposite direction from said first sealing flange.

6. The separator of claim 1, wherein said plate is substantially rectangular in shape, said separator comprising two of said sealing flanges respectively disposed along opposite side edges of said plate.

7. The separator of claim 1, wherein said plate is substantially rectangular in shape, said separator including two first sealing flanges respectively disposed along opposite side edges of said plate and projecting from the plane thereof in a first direction, and two second sealing flanges respectively disposed along the other two side edges of said plate and projecting therefrom in the opposite direction.

8. A fuel cell separator comprising a substantially flat, planar, gas-impermeable plate, and a sealing flange unitary with said plate and consisting of a peripheral margin of said plate with spaced-apart ends folded back upon itself, said sealing flange including a first portion spaced from said plate and a second portion resiliently compressible in a direction generally normal to the plane of said plate for accommodating variation in the spacing between said first portion and said plate, and closure means connected to said sealing flange at the opposite ends thereof for closing same without interfering with the compressibility thereof.

9. The separator of claim 8, wherein said closure means comprises two closure members respectively disposed at opposite ends of said sealing flange.

10. The separator of claim 9, wherein said plate is substantially rectangular in shape, said separator including two of said sealing flanges respectively disposed along opposite side edges of said plate and closure means closing the opposite ends of each of said sealing flanges.

11. The separator of claim 9, wherein each of said closure members includes wall structure interconnecting said first portion of said sealing flange and said plate.

12. The separator of claim 11, wherein said wall structure is accordion pleated to afford resilient compressibility.

13. The separator of claim 11, wherein said sealing flange further includes a third portion extending from said first portion toward said plate and cooperating with said first and second portions and said plate to define a substantially closed passage, each of said closure members being connected to the adjacent end of said third portion of said sealing flange.

14. The separator of claim 8, wherein said sealing flange is a first sealing flange projecting in a first direction from the plane of said plate, and further including a second sealing flange projecting from the plane of said plate in the opposite direction from said first sealing flange, said first and second sealing flanges extending along adjacent peripheral margins of said plate, said closure means including first closure members respectively disposed at the opposite ends of said first sealing flange, and second closure members respectively disposed at the opposite ends of said second sealing flange.

15. A fuel cell separator comprising a substantially flat, planar, gas-impermeable plate, a sealing flange unitary with said plate and consisting of a peripheral margin of said plate folded back upon itself to overlap a portion of said plate for cooperation therewith to define an elongated passage, said sealing flange including a first portion spaced from said plate and a second portion resiliently compressible in a direction generally normal to the plane of said plate for accommodating variation in the spacing between said first portion and said plate, said second portion of said sealing flange comprises an accordion pleated portion interconnecting said first portion and said plate, and resiliently compressible reinforcing means disposed in said passage and engageable with said plate and said first portion of said sealing flange to control the compressibility of said sealing flange.

16. The separator of claim 15, wherein said reinforcing means is freely disposed in said passage.

17. The separator of claim 15, wherein said reinforcing means extends substantially the entire length of said sealing flange.

18. The separator of claim 17, wherein said reinforcing means is substantially hat-shaped in transverse cross section.

19. The separator of claim 15 and further including closure means connected to said sealing flange at the opposite ends thereof for closing same without interfering with the compressibility thereof.

* * * * *